United States Patent
Ragupathi et al.

(10) Patent No.: US 10,955,886 B2
(45) Date of Patent: Mar. 23, 2021

(54) SYSTEMS AND METHODS FOR GRACEFUL TERMINATION OF APPLICATIONS IN RESPONSE TO POWER EVENT

(71) Applicant: Dell Products L.P., Round Rock, TX (US)

(72) Inventors: Dinesh Kunnathur Ragupathi, Round Rock, TX (US); Yogesh Prabhakar Kulkarni, Round Rock, TX (US); Balaji Bapu Gururaja Rao, Austin, TX (US); Elie Antoun Jreij, Pflugerville, TX (US); Pushkala Iyer, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 184 days.

(21) Appl. No.: 15/153,583

(22) Filed: May 12, 2016

(65) Prior Publication Data
US 2017/0329638 A1 Nov. 16, 2017

(51) Int. Cl.
*G06F 9/46* (2006.01)
*G06F 1/26* (2006.01)
*G06F 1/28* (2006.01)
*G06F 1/30* (2006.01)
*G06F 9/48* (2006.01)

(52) U.S. Cl.
CPC ............... *G06F 1/263* (2013.01); *G06F 1/28* (2013.01); *G06F 1/30* (2013.01); *G06F 9/485* (2013.01); *G06F 9/4893* (2013.01); *Y02D 10/00* (2018.01)

(58) Field of Classification Search
CPC . G06F 9/505; G06F 1/263; G06F 1/28; G06F 1/30
See application file for complete search history.

(56) References Cited

U.S. PATENT DOCUMENTS

| | | | |
|---|---|---|---|
| 5,315,161 A * | 5/1994 | Robinson | G06F 1/30 307/66 |
| 9,891,678 B2 * | 2/2018 | Butcher | G06F 1/24 |
| 2008/0061744 A1 * | 3/2008 | Morohoshi | G06F 1/3203 320/136 |
| 2010/0211950 A1 * | 8/2010 | Kusko | G06F 9/485 718/100 |
| 2011/0001457 A1 * | 1/2011 | Mueller | G01R 31/3646 320/136 |

(Continued)

OTHER PUBLICATIONS

Microsoft, Best Practices for Managing Applications with Process Control, Microsoft, Jun. 2001, 32 pages.*

*Primary Examiner* — Diem K Cao
(74) *Attorney, Agent, or Firm* — Jackson Walker LLP; Christopher J. Rourk

(57) ABSTRACT

In accordance with embodiments of the present disclosure, an information handling system may include a processor, a power supply unit for supplying electrical energy to information handling resources of the information handling system, a battery backup unit for supplying electrical energy to the information handling resources responsive to a power event associated with the power supply unit, and a non-transitory computer-readable readable medium having embodied thereon a program of instructions configured to, when executed, in response to the power event, gracefully terminate one or more applications executing on the processor in accordance with a desired priority ranking.

14 Claims, 2 Drawing Sheets

(56) References Cited

U.S. PATENT DOCUMENTS

| | | | |
|---|---|---|---|
| 2012/0210325 A1* | 8/2012 | de Lind van Wijngaarden | H04W 52/0258 718/103 |
| 2014/0208133 A1* | 7/2014 | Gopal | G06F 11/2294 713/310 |
| 2014/0281608 A1* | 9/2014 | Yin | G06F 1/3212 713/320 |
| 2015/0153810 A1* | 6/2015 | Sasidharan | G06F 1/3212 713/320 |

* cited by examiner

SYSTEMS AND METHODS FOR GRACEFUL TERMINATION OF APPLICATIONS IN RESPONSE TO POWER EVENT

TECHNICAL FIELD

The present disclosure relates in general to information handling systems, and more particularly to systems and methods for providing a configurable power supply undervoltage setting in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. Typically, a power supply unit is configured to operate from an input alternating current (AC) source of electrical energy, which the power supply unit converts to a direct current (DC) output. Thus, typically a power supply unit may include a rectifier and/or power factor correction stage to receive the input AC source and rectify the input AC waveform to charge a bulk capacitor to a desired voltage. A direct-current-to-direct-current (DC-DC) stage may convert the voltage on the bulk capacitor to a DC output voltage which may be used to power components of the information handling system.

Some information handling systems also utilize one or more battery backup units. A battery backup unit may be configured to, in response to a power event (e.g., an alternating current source loss to a power supply unit or other fault or failure of such a power supply unit), supply energy stored in a battery or other energy storage device (e.g., a capacitor) to components of the information handling system. Accordingly, in information handling systems equipped with battery backup units, power may be retained for a small amount of time after the power event. However, the energy available from the battery backup unit may not be sufficient to allow for graceful shutdown of all applications executing on the information handling system, which may lead to catastrophic outcomes.

SUMMARY

In accordance with the teachings of the present disclosure, the disadvantages and problems associated with existing approaches to termination of applications executing in an information handling system may be reduced or eliminated.

In accordance with embodiments of the present disclosure, an information handling system may include a processor, a power supply unit for supplying electrical energy to information handling resources of the information handling system, a battery backup unit for supplying electrical energy to the information handling resources responsive to a power event associated with the power supply unit, and a non-transitory computer-readable readable medium having embodied thereon a program of instructions configured to, when executed, in response to the power event, gracefully terminate one or more applications executing on the processor in accordance with a desired priority ranking.

In accordance with these and other embodiments of the present disclosure, a method may include determining an occurrence of a power event associated with a power supply unit for supplying electrical energy to information handling resources of an information handling system, and responsive to the power event, gracefully terminating one or more applications executing on a processor of the information handling system in accordance with a desired priority ranking.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to determine an occurrence of a power event associated with a power supply unit for supplying electrical energy to information handling resources of an information handling system, and responsive to the power event, gracefully terminate one or more applications executing on a processor of the information handling system in accordance with a desired priority ranking.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
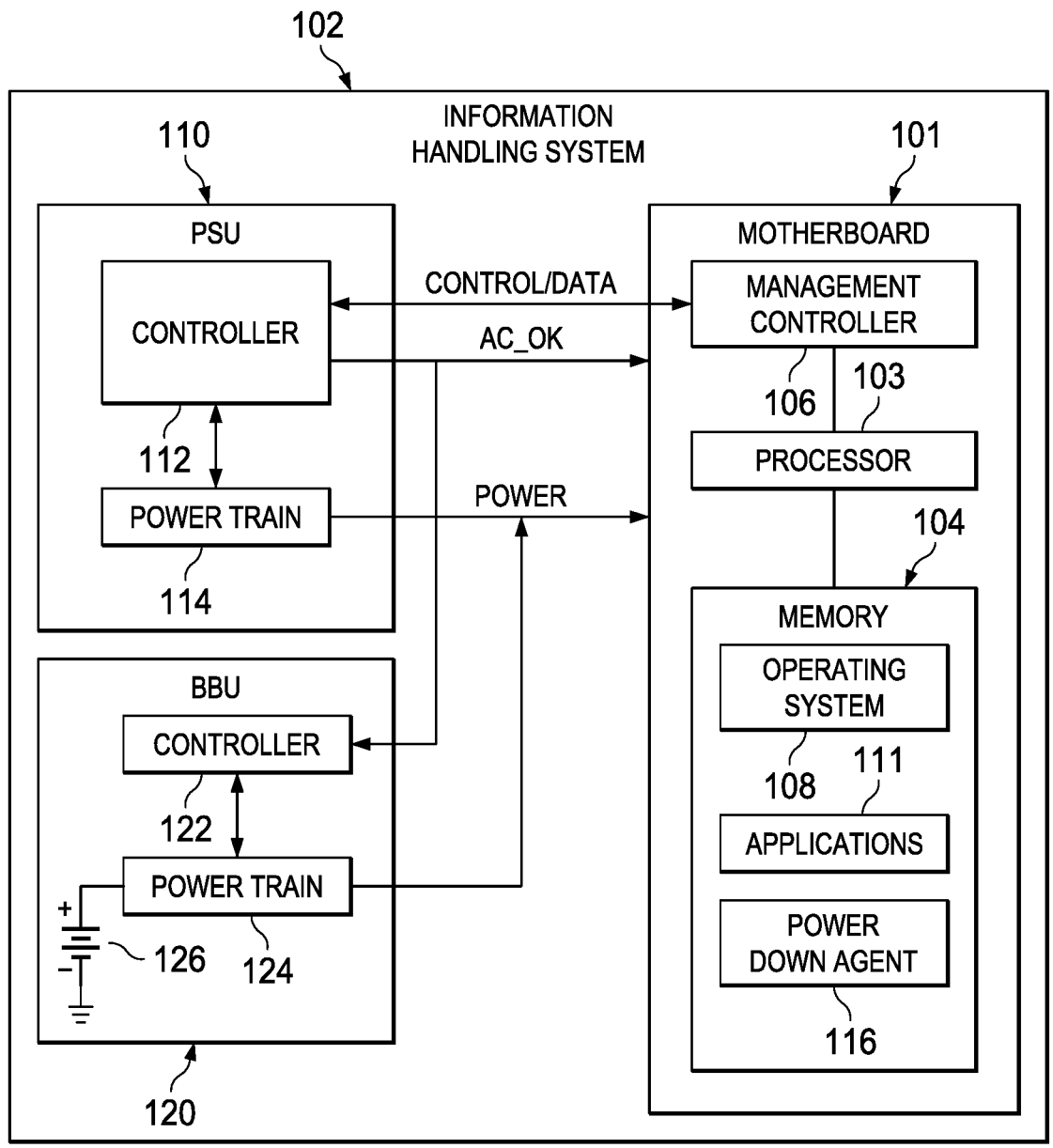
FIG. 1 illustrates a block diagram of an example information handling system, in accordance with embodiments of the present disclosure.
Figure 2:
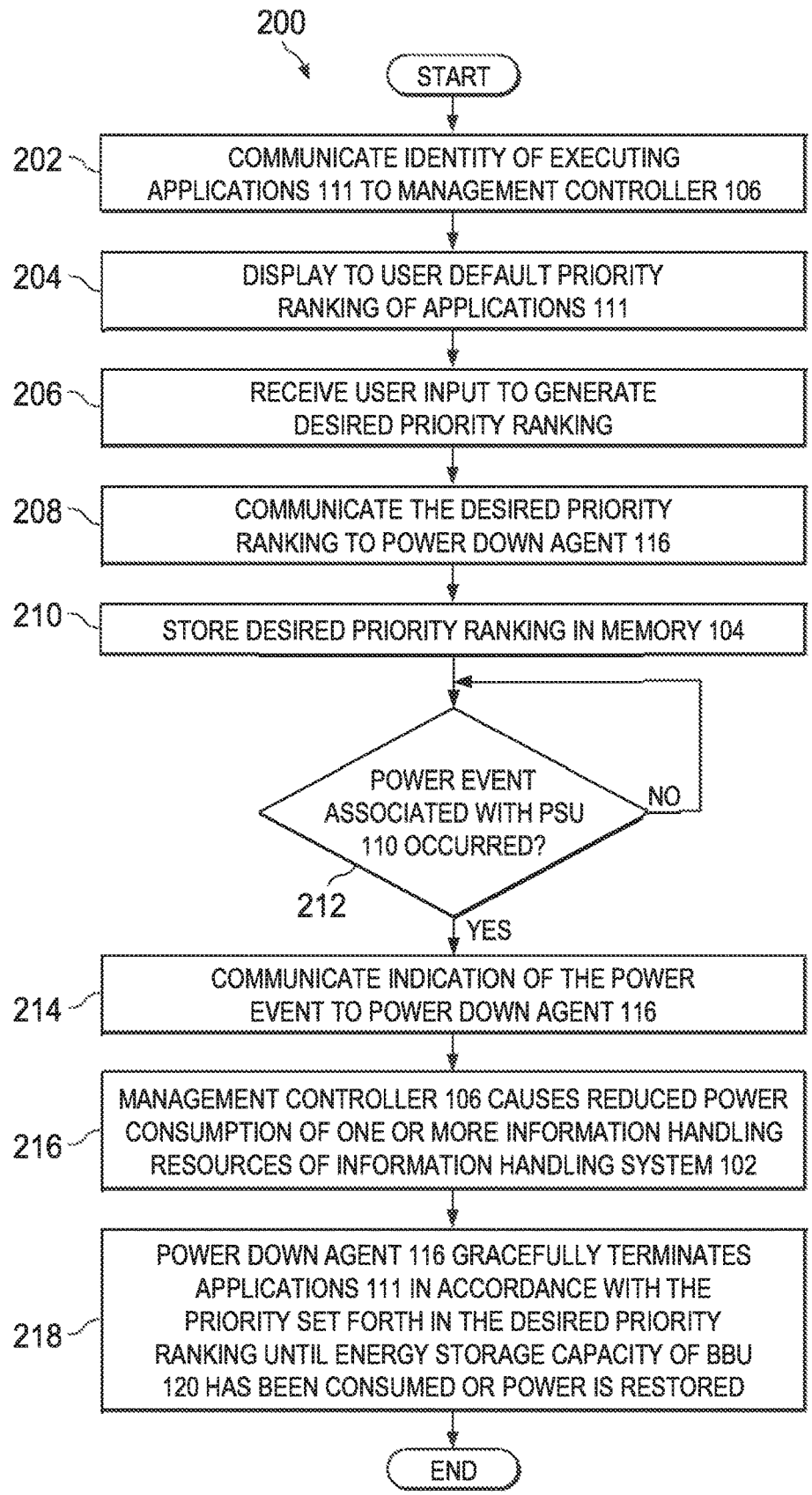
FIG. 2 illustrates a flow chart of an example method for graceful termination of applications in response to a power event, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102. As depicted, information handling system 102 may include a power supply unit (PSU) 110, a battery backup unit (BBU) 120, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory 104 may comprise a non-volatile memory comprising one or more NVDIMMs.

As shown in FIG. 1, memory 104 may have stored thereon an operating system (OS) 108, one or more applications 111, and a power down agent 116.

OS 108 may comprise any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 108. Although FIG. 1 depicts OS 108 as being stored in memory 104, in some embodiments, active portions of OS 108 may be transferred to memory 104 from a computer-readable medium (e.g., a hard disk drive) for execution by processor 103.

An application 111 may comprise any program of executable instructions, or aggregation of programs of executable instructions, configured to, when read and executed by processor 103, interact with operating system 108 in order to perform a group of coordinated functions, tasks, or activities.

Power down agent 116 may comprise any program of instructions configured to, when read and executed by processor 103, provide an interface between OS 108 and management controller 106 for allowing a user of information handling system 102 to prioritize applications 111 for priority treatment in response to a power event associated with PSU 110, as described in greater detail below. Although power down agent 116 is shown as a program of instructions separate from OS 108, in some embodiments, power down agent 116 may comprise a module, driver, or other components of OS 108.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110 (e.g., via a Power Management Bus). For example, PSUs 110 may communicate information regarding status and/or health of PSUs 110 and/or measurements of electrical parameters (e.g., electrical currents or voltages) present within PSU 110.

Generally speaking, PSU 110 may include any system, device, or apparatus configured to supply electrical current to one or more information handling resources of information handling system 102. As shown in FIG. 1, PSU 110 may include a controller 112 and a power train 114. Power train 114 of PSU 110 may be coupled at its outputs to a power bus configured to deliver electrical energy to motherboard 101 and other components of information handling system 102.

Controller 112 may comprise a microprocessor, DSP, ASIC, FPGA, EEPROM, or any combination thereof, or any other device, system, or apparatus for controlling operation of PSU 110. As such, controller 112 may comprise firmware, logic, and/or data for controlling functionality of PSU 110. As shown in FIG. 1, a controller 112 may be communicatively coupled to management controller 106 allowing for communication of data and/or control signals between management controller 106 and controller 112.

Power train 114 may include any suitable system, device, or apparatus for converting electrical energy received by PSU 110 (e.g., a 120-volt alternating current voltage waveform) into electrical energy usable to information handling resources of information handling system 102 (e.g., 12-volt direct current voltage source). In some embodiments, power train 114 may comprise a rectifier. In these and other embodiments, power train 114 may comprise a voltage regulator (e.g., a multi-phase voltage regulator). An example implementation of power train 114 is set forth in FIG. 2 below.

Generally speaking, BBU 120 may include any system, device, or apparatus configured to supply electrical current to one or more information handling resources of information handling system 102. In some embodiments, BBU 120 may be configured to supply electrical current responsive to a power event. In some embodiments, in the event of a power event associated with PSU 110 (e.g., failure, loss of an input power source to PSU 110, etc.), PSU 110 may de-assert a signal (labeled AC_OK in FIG. 1, indicating loss by such PSU 110 of its alternating current input sources) and communicate such signal to BBU 120, causing BBU 120 to activate from a deactivated state to supply electrical current to a power bus of information handling system 102.

Controller 122 may comprise a microprocessor, DSP, ASIC, FPGA, EEPROM, or any combination thereof, or any other device, system, or apparatus for controlling operation of BBU 120. As such, controller 122 may comprise firmware, logic, and/or data for controlling functionality of BBU 120.

Power train 124 may include any suitable system, device, or apparatus for converting electrical energy received by BBU 120 from a battery 126 or other energy storage device (e.g., a capacitor) into electrical energy usable to information handling resources of information handling system 102 (e.g., 12-volt direct current voltage source). Accordingly, in some embodiments, power train 124 may comprise a direct-current-to-direct-current converter (e.g., a boost converter or buck converter). In operation, a power train 124 may deliver an amount of electrical current to a power bus of information handling system 102 in accordance with a control signal communicated from controller 122 indicative of a desired amount of electrical current to be delivered.

In addition to motherboard 101, processor 103, memory 104, management controller 106, PSU 110, and BBU 120, information handling system 102 may include one or more other information handling resources. For example, in some embodiments, information handling system 102 may include more than one PSU 110.

In operation, management controller 106 may interface with power down agent 116 in order to allow a user (e.g., an administrator interfacing with management controller 106 via a local or remote management console) to prioritize which applications 111 are gracefully terminated (e.g., as opposed to an abrupt, forced termination) such that those applications may perform tasks such as saving application state and/or flushing its data cache to avoid data loss prior to BBU 120 running out of energy to support operation. In addition, management controller 106 may be able to interface with power down agent 116 to control such prioritized graceful termination of applications, as well as take steps to extend life of BBU 120, such as causing reduction in power consumption of information handling resources of information handling system 102 (e.g., reduction of speed of processor 103 and memory 104; reduction of speeds of fans for cooling information handling system, etc.). Accordingly, management controller 106 may include both a setup process and a runtime process.

In the setup process, management controller 106 may interface with power down agent 116 to receive a list of all applications 111 executing on processor 103, and power down agent 116 may present such list to a user (e.g., an administrator interfacing with management controller 106 via a local or remote management console). The user may then set a priority order of applications to gracefully terminate in response to a power event of PSU 110. For example, if one of the applications 111 is a database application, a user may desire to make it the highest priority application 111 such that if a power event occurs, the database application may flush its data to disk and terminate gracefully before the available energy of BBU 120 is expended. In some embodiments, management controller 106 may provide a default ranking of applications 111 based on a table of known applications. For example, management controller 106 may include a list of most-used applications of most users with a pre-defined ranking, and a default priority list displayed to the user by power down agent 116 may be based on such pre-defined ranking, for which the user may alter such ranking.

In addition, in some embodiments, management controller 106 may be able to determine how much power each application 111 may consume in order to gracefully terminate, so that it may communicate to the user which and how many of the applications as prioritized by the user may be gracefully terminated in response to a power event. For example, to make such determination, management controller 106 may determine (e.g., based on data communicated from PSU 110) the power consumption level of information handling system 102 and measure energy needed for graceful termination by running a test procedure in which it gracefully terminates each application and measures power draw needed to perform such graceful termination (e.g., energy needed equals power draw during termination multiplied by time of termination operation).

In the runtime process, when OS 108 boots and is loaded, power down agent 116 may read the priority list from management controller 106 and store it in memory 104. In addition, during runtime of OS 108, management controller 106 may monitor the status of PSU 110 (e.g., the AC_OK signal output by PSU 110). If a power event associated with PSU 110 occurs, management controller 106 may communicate an indication of such power event to power down agent 116, which may in turn cause OS 108 to gracefully terminate applications 111 in accordance with the priority list. For example, in a Windows OS, power down agent 116 may issue a "taskkill" command in order to terminate an application 111 based on various parameters and filters. As another example, in a Linux-based OS, power down agent 116 may issue a "kill" command in order to terminate an application 111.

In addition to the foregoing functionality, in response to a power event, management controller 106 may also reduce speeds of cooling fans of information handling system 102, reduce speed of processor 103, reduce speed of memory 104, and/or control other information handling resources to reduce their respective power consumption, in order to extend an amount of time in which BBU 120 may provide energy after the power event. Such reduction in power consumption may be accomplished by communicating messages via Systems Management Bus, System Power Bus, an Inter-Integrated Circuit bus, Management Component Transport Protocol, and/or any other suitable transport or standard.

FIG. 2 illustrates a flow chart of an example method 200 for graceful termination of applications in response to a power event, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, power down agent 116 may determine which applications 111 are executing on OS 108 and communicate such information to management controller 106. At step 204, management controller 106 may display to a user a default priority ranking of the applications 111. In some embodiments, power down agent 116 may also indicate which applications 111 can be gracefully terminated in accordance with the energy storage capacity of BBU 120 if terminated in order of the default priority ranking. At step 206, management controller 106 may allow for a user to modify such default priority ranking to a desired priority ranking. In some embodiments, management controller 106 may also indicate which applications 111 can be gracefully terminated in accordance with the energy storage capacity of BBU 120 if terminated in order of the desired priority ranking. At step 208, management controller 106 may communicate the desired priority ranking to power down agent 116. At step 210, power down agent 116 may store the desired priority ranking in memory 104.

At step 212, management controller 106 may determine if a power event associated with PSU 110 has occurred. If a power event occurs, method 200 may proceed to step 214. Otherwise, method 200 may remain at step 212 until a power event occurs.

At step 214, in response to the power event, management controller 106 may communicate an indication of the power event to power down agent 116. At step 216, management controller 106 may issue one or more commands to reduce power consumption of one or more information handling resources of information handling system 102. At step 218, power down agent 116 may gracefully terminate applications 111 in accordance with the priority set forth in the desired priority ranking. Method 200 may end once the energy storage capacity of BBU 120 has been consumed.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

In some embodiments, in lieu of power down agent 116 executing on OS 108, management controller 106 may attach a partition (e.g., Universal Serial Bus partition) with an autorun script that executes responsive to a power event, wherein the autorun script gracefully terminates the applications in accordance with the desired priority ranking.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor;
   a power supply unit for supplying electrical energy to information handling resources of the information handling system;
   a battery backup unit for supplying electrical energy to the information handling resources responsive to a power event associated with the power supply unit; and
   a non-transitory computer-readable medium having embodied thereon a program of instructions configured to, when executed, determine an occurrence of the power event, terminate one or more applications executing on the processor in accordance with a desired priority ranking associated with each application that prevents forced termination of the one or more applications, wherein a management controller is further configured to display an indication to a user of a default listing of which applications set forth in the desired priority ranking can be gracefully terminated within an available energy storage capacity of the battery backup unit in response to the power event and to receive an indication from the user to modify the default listing, wherein the management controller is configured to provide out of band management facilities and is communicatively coupled to the power supply unit and the processor and wherein the non-transitory computer-readable medium comprises a partition attached to the management controller.

2. The information handling system of claim 1, wherein the program of instructions is executed by the processor.

3. The information handling system of claim 1, wherein the management controller further comprises an out of band network interface and is configured to interface with a user of the information handling system to allow the user to set the desired priority ranking.

4. The information handling system of claim 3, wherein the management controller is further configured to communicate to the program of instructions the desired priority ranking only for applications that are in operation.

5. The information handling system of claim 3, wherein the management controller coupled to the power supply unit and the processor is further configured to cause reduction in power consumption of one or more of the information handling resources responsive to the power event.

6. The information handling system of claim 1, wherein the management controller is further configured to determine for each of one or more applications that are presently operating an energy required for such application to be gracefully terminated.

7. An information handling system comprising:
a processor;
a power supply unit for supplying electrical energy to information handling resources of the information handling system;
a battery backup unit for supplying electrical energy to the information handling resources responsive to a power event associated with the power supply unit; and
a non-transitory computer-readable medium having embodied thereon a program of instructions configured to, when executed, determine an occurrence of the power event, terminate one or more applications executing on the processor in accordance with a desired priority ranking associated with each application that prevents forced termination of the one or more applications, wherein a management controller is further configured to display an indication to a user of a default listing of which applications set forth in the desired priority ranking can be gracefully terminated within an available energy storage capacity of the battery backup unit in response to the power event and to receive an indication from the user to modify the default listing, wherein the management controller is configured to provide out of band management facilities and is communicatively coupled to the power supply unit and the processor and wherein the non-transitory computer-readable medium comprises a partition attached to the management controller, wherein the program of instructions is executed by the processor and the management controller further comprises an out of band network interface and is configured to interface with a user of the information handling system to allow the user to set the desired priority ranking.

8. The information handling system of claim 7, wherein the management controller is further configured to determine for each of one or more applications that are presently operating an energy required for such application to be gracefully terminated.

9. The information handling system of claim 7, wherein the management controller is further configured to communicate to the program of instructions the desired priority ranking only for applications that are in operation.

10. The information handling system of claim 7, wherein the management controller coupled to the power supply unit and the processor is further configured to cause reduction in power consumption of one or more of the information handling resources responsive to the power event.

11. An information handling system comprising:
a processor;
a power supply unit for supplying electrical energy to information handling resources of the information handling system;
a battery backup unit for supplying electrical energy to the information handling resources responsive to a power event associated with the power supply unit; and
a non-transitory computer-readable medium having embodied thereon a program of instructions configured to, when executed, determine an occurrence of the power event, terminate one or more applications executing on the processor in accordance with a desired priority ranking associated with each application that prevents forced termination of the one or more applications, wherein a management controller is further configured to display an indication to a user of a default listing of which applications set forth in the desired priority ranking can be gracefully terminated within an available energy storage capacity of the battery backup unit in response to the power event and to receive an indication from the user to modify the default listing, wherein the management controller is configured to provide out of band management facilities and is communicatively coupled to the power supply unit and the processor and wherein the non-transitory computer-readable medium comprises a partition attached to the management controller, wherein the program of instructions is executed by the processor and the management controller is further configured to determine for each of one or more applications that are presently operating an energy required for such application to be gracefully terminated.

12. The information handling system of claim 11, wherein the management controller further comprises an out of band network interface and is configured to interface with a user of the information handling system to allow the user to set the desired priority ranking.

13. The information handling system of claim 12, wherein the management controller is further configured to communicate to the program of instructions the desired priority ranking only for applications that are in operation.

14. The information handling system of claim 12, wherein the management controller coupled to the power supply unit and the processor is further configured to cause reduction in power consumption of one or more of the information handling resources responsive to the power event.

* * * * *